(12) United States Patent
Hashimoto et al.

(10) Patent No.: US 11,410,516 B2
(45) Date of Patent: Aug. 9, 2022

(54) DETECTION DEVICE, DETECTION METHOD, ROBOT, AND PROGRAM

(71) Applicant: MITSUBISHI HEAVY INDUSTRIES, LTD., Tokyo (JP)

(72) Inventors: Ryo Hashimoto, Tokyo (JP); Masaki Honda, Tokyo (JP); Shigeru Yoshida, Tokyo (JP); Gen Sakashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/158,173

(22) Filed: Jan. 26, 2021

(65) Prior Publication Data

US 2021/0272434 A1 Sep. 2, 2021

(30) Foreign Application Priority Data

Feb. 28, 2020 (JP) .............................. JP2020-033338

(51) Int. Cl.

| G08B 13/24 | (2006.01) |
| G01S 17/04 | (2020.01) |
| G01S 17/08 | (2006.01) |
| G07C 9/28 | (2020.01) |
| G06V 20/20 | (2022.01) |
| G06V 20/52 | (2022.01) |
| G06V 40/20 | (2022.01) |

(52) U.S. Cl.
CPC .......... *G08B 13/2494* (2013.01); *G01S 17/04* (2020.01); *G01S 17/08* (2013.01); *G07C 9/28* (2020.01); *G06V 20/20* (2022.01); *G06V 20/52* (2022.01); *G06V 40/20* (2022.01)

(58) Field of Classification Search
None
See application file for complete search history.

(56) References Cited

U.S. PATENT DOCUMENTS

| 2007/0257783 | A1* | 11/2007 | Matsumoto | ............ B60Q 1/506 340/425.5 |
| 2016/0375862 | A1 | 12/2016 | Ito et al. | |
| 2017/0225321 | A1* | 8/2017 | Deyle | .................... B25J 9/1679 |

FOREIGN PATENT DOCUMENTS

| JP | 2012-215959 | 11/2012 |
| JP | 2013-073590 | 4/2013 |
| JP | 6562736 | 8/2019 |

* cited by examiner

*Primary Examiner* — Thomas S McCormack
(74) *Attorney, Agent, or Firm* — Wenderoth, Lind & Ponack, L.L.P.

(57) ABSTRACT

A detection device includes a detection unit configured to detect a moving object by using a ranging sensor able to detect the presence of a moving object movable in the target area, a determination unit configured to determine whether or not the detected moving object is a human being by using a human detection sensor able to detect a human being, and an authentication unit configured to perform authentication of the detected moving object in a case that the detected moving object is determined to be a human being. The authentication unit includes an authentication information request unit configured to request the moving object to transmit authentication information by wireless communication, and an authentication determination unit configured to determine whether or not the moving object has the right of access based on a result of the wireless communication.

14 Claims, 8 Drawing Sheets

|  | | PEOPLE CONCERNED | | | OUTSIDERS |
|---|---|---|---|---|---|
|  | | ACCESS AUTHORITY·HIGH | ACCESS AUTHORITY·MIDDLE | ACCESS AUTHORITY·LOW | ACCESS AUTHORITY·NONE |
| RESTRICTED AREA EVEN FOR PEOPLE CONCERNED | SECURITY LEVEL HIGH | ALLOWED | NOT ALLOWED | NOT ALLOWED | NOT ALLOWED |
| | SECURITY LEVEL MIDDLE | ALLOWED | ALLOWED | NOT ALLOWED | NOT ALLOWED |
| | SECURITY LEVEL LOW | ALLOWED | ALLOWED | ALLOWED | NOT ALLOWED |
| OTHER AREAS | | ALLOWED | ALLOWED | ALLOWED | NOT ALLOWED |

ALLOWED: ACCESS PERMITTED, NOT ALLOWED: ACCESS NOT PERMITTED

FIG. 3

DETECTION DEVICE, DETECTION METHOD, ROBOT, AND PROGRAM

CROSS-REFERENCE TO RELATED APPLICATIONS

This application claims the benefit of priority to Japanese Patent Application Number 2020-033338 filed on Feb. 28, 2020. The entire contents of the above-identified application are hereby incorporated by reference.

TECHNICAL FIELD

The present disclosure relates to a technique for detecting suspicious persons.

RELATED ART

For example, as one of patrol check items of a plant such as an electric power station, security against suspicious persons, movement line management of workers, or the like can be cited. These operations may be carried out several times in shifts every day, and in a case where the operations are carried out by patrollers (persons), there arise problems of an increase in costs such as labor costs, a lack of members or the like to organize the patrol teams, and the like. It may be considered to apply a method in which monitoring cameras are installed to monitor suspicious persons, but there are problems that a large number of cameras are required to be installed in a broad site and blind spots are generated in the cameras depending on the locations.

To address the above-described problems, for example, in JP 6562736 B, a camera, a ranging sensor (LiDAR), and the like are mounted on an autonomous traveling device capable of autonomously traveling, then a human body is recognized based on image data taken by the camera, and it is determined whether or not the recognized human body matches pre-stored person registration information, whereby a suspicious person is detected. Further, in JP 2012-215959 A, it is described that a patrol robot configured to autonomously perform patrol in a range to be patrolled performs imaging of the ambient environment of the robot by using an infrared camera, and determines a change in temperature distribution of the image information, whereby an intruder (suspicious person) is detected.

Note that JP 2013-73590 A discloses a system configured to find out (detect) the presence of a suspicious person based on a person tag being carried by a person permitted to go in and out of the environment which people go in and out of.

SUMMARY

For example, in a plant, there are many areas including an area where it is compulsory to wear protective glasses and a mask and an area where large noise is output from devices, which makes it difficult to apply techniques therein such as face authentication by using a camera and voice recognition by using a microphone. In the case of the face authentication, the distance at which the face authentication can be performed is limited in a dark location at night, for example, and the image authentication of a person, a face, and the like may not be suitably performed when the suspicious person moves at a relatively high speed, for example, at a running pace. Due to this, there arises a big issue when a scheme in which a person is found out and is subjected to authentication based on a captured image as described in JP 6562736 B is applied in monitoring a suspicious person in a plant. In addition, since a distance that can be monitored by an infrared camera is not long, when the detection and authentication of a person are performed only by an infrared camera as in JP 2012-215959 A, a situation is assumed in which even an object cannot be sufficiently detected depending on the distance from a patrol robot to a suspicious person.

In view of the above-described circumstances, an object of at least one embodiment of the present invention is to provide a detection device able to suitably monitor a suspicious person in a target area such as a plant.

A detection device according to at least one embodiment of the present invention is a detection device configured to determine the presence or absence of the right of access to an interior of a target area of a human being present in the interior of the target area, the detection device includes:

a detection unit configured to detect a moving object, by using a ranging sensor able to detect the presence of the moving object movable in the target area;

a determination unit configured to determine whether or not the detected moving object is a human being by using a human detection sensor able to detect a human being; and an authentication unit configured to perform authentication of the detected moving object in a case that the detected moving object is determined to be a human being, the authentication unit includes, an authentication information request unit configured to request the moving object to transmit authentication information by wireless communication, and an authentication determination unit configured to determine whether or not the moving object has the right of access based on a result of the wireless communication.

A robot according to at least one embodiment of the present invention includes:

the above-described detection device;

a main body portion on which the detection device is mounted;

a drive device configured to move the main body portion; and a control unit configured to control the drive device.

A detection method according to at least one embodiment of the present invention is a detection method for determining the presence or absence of the right of access to an interior of a target area of a human being present in the interior of the target area, the detection method includes:

a step of detecting the moving object, by using a ranging sensor able to detect the presence of a moving object movable in the target area;

a step of determining whether or not the detected moving object is a human being by using a human detection sensor able to detect a human being; and a step of performing authentication of the detected moving object in a case that the detected moving object is determined to be a human being, the step of performing the authentication includes, a step of requesting the moving object to transmit authentication information by wireless communication, and a step of determining the authentication of whether or not the moving object has the right of access based on a result of the wireless communication.

A detection program according to at least one embodiment of the present invention is a detection program configured to determine the presence or absence of the right of access to an interior of a target area of a human being present in the interior of the target area, the detection program includes:

causing a computer to realize, a detection unit configured to detect a moving object, by using a ranging sensor able to detect the presence of the moving object movable in the target area;

a determination unit configured to determine whether or not the detected moving object is a human being by using a human detection sensor able to detect a human being; and an authentication unit configured to perform authentication of the detected moving object in a case that the detected moving object is determined to be a human being, and including an authentication information request unit configured to request the moving object to transmit authentication information by wireless communication, and an authentication determination unit configured to determine whether or not the moving object has the right of access based on a result of the wireless communication.

According to one embodiment of the present invention, there is provided a detection device able to suitably monitor a suspicious person in a target area such as a plant.

BRIEF DESCRIPTION OF DRAWINGS

The disclosure will be described with reference to the accompanying drawings, wherein like numbers reference like elements.

FIG. 3 is a diagram illustrating a relationship between a security level and access authority according to one embodiment of the present invention.

DESCRIPTION OF EMBODIMENTS

Embodiments of the present invention will be described hereinafter with reference to the appended drawings. It is intended, however, that dimensions, materials, shapes, relative arrangements and the like of constituent elements illustrated in the embodiments are only examples and not intended to be limited to the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance within a range in which it is possible to achieve the same function.

For instance, an expression of an equal state such as "same", "equal", "uniform" and the like shall not be construed as indicating only the state in which the feature is strictly equal, but also includes a state in which there is a tolerance or a difference within a range where it is possible to achieve the same function.

Further, for instance, an expression of a shape such as a rectangular shape, a cylindrical shape or the like shall not be construed as only the geometrically strict shape, but also includes a shape with unevenness, chamfered corners or the like within the range in which the same effect can be achieved.

On the other hand, an expression such as "comprise", "include", "have", "contain" and "constitute" are not intended to be exclusive of other constituent elements.

Description of Monitoring System

Figure 1:
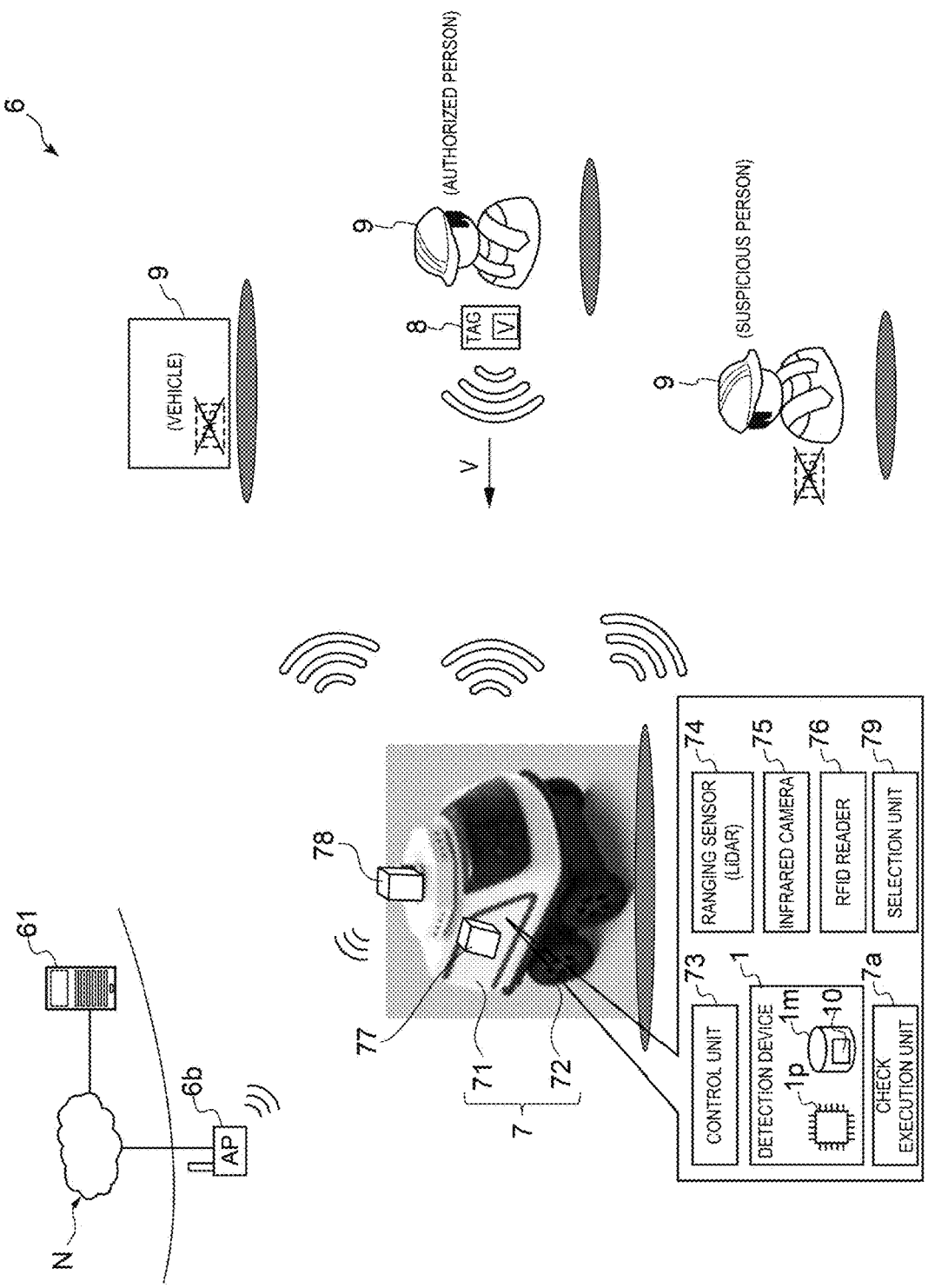
FIG. 1 is a diagram schematically illustrating a configuration of a monitoring system according to one embodiment of the present invention.

FIG. 1 is a diagram schematically illustrating a configuration of a monitoring system 6 according to one embodiment of the present invention.

The monitoring system 6 is a system configured to determine whether or not a person present in (having entered into) any area to be monitored (hereinafter, referred to as a target area) in a plant or a building, for example, has the right of access to the interior the target area. More specifically, for example, the monitoring system 6 may be a suspicious person monitoring system able to detect a person without the right of access to the interior of the target area (hereinafter, referred to as a suspicious person) having intruded into the target area, by determining the presence or absence of the right of access.

Hereinafter, as illustrated in FIG. 1, when the monitoring system 6 is described as the above-described suspicious person monitoring system, the monitoring system 6 includes a radio tag 8, and a detection device 1 (suspicious person detection device) configured to detect a suspicious person having intruded into the target area through determining the presence or absence of the right of access. The radio tag 8 is a radio frequency identifier (RFID) tag such as an IC tag capable of performing communication by utilizing the RFID communication principle. And the monitoring system 6 is a system assuming that a human being permitted to enter the target area (hereinafter, referred to as an authorized person) carries the radio tag 8 and that those other than the authorized person (suspicious persons, those other than a human being, and the like) do not have the tag.

Specifically, as illustrated in FIG. 1, the above-described detection device 1 may be configured to be movable in the target area by being mounted on a robot 7 provided with a main body portion 71 configured to install (mount) an instrument necessary for suspicious-person detection or the like as described below, a drive device 72 configured to move the main body portion 71, and a control unit 73 configured to control operations of the drive device 72. For example, as illustrated in FIG. 1, the robot 7 may be a ground-traveling type robot such as an unmanned ground vehicle (UGV) configured to travel by the power of a vehicle-mounted battery or the like (see FIG. 1). In this case, the drive device 72 includes wheels. Alternatively, the robot 7 may be a flying-type robot such as an unmanned aerial vehicle (UAV) like a drone. In this case, the drive device 72 includes a propeller and wings.

Then, the control unit 73 controls the drive device 72 in such a manner that the robot 7 moves in (travels in or flights over) the target area along a specified (set) movement route R.

Specifically, in some embodiments, the control unit 73 may automatically control the drive device 72 based on map information M, from which the movement route M can be understood, and a current position of the robot 7 obtained by using a self-position estimation unit mounted on the robot 7. The map information M may be a two-dimensional map or a three-dimensional map, and may be created by making the robot 7 move in the target area with simultaneous localization and mapping (SLAM) using, for example, a depth camera (depth sensor) a ranging sensor 74 or the like such as light detecting and ranging (LiDAR) and the like, irradiating laser beams on the periphery to be capable of finding out an object and a distance to the object based on the reflected light from the periphery. The self-position estimation unit may be a known unit. It may be, for example, a global navigation satellite system (GNSS) such as GPS, an autonomous navigation device based on an orientation and a distance found out by a sensor mounted on the robot 7, the ranging sensor 74 or the like. This allows autonomous movement of the robot 7.

Alternatively, in some other embodiments, the control unit 73 may receive an instruction corresponding to a remote operation for a monitoring member (operator) or the like, and may control the drive device 72 in accordance with the instruction. Specifically, the robot 7 is equipped with the ranging sensor 74, a visible light camera, or the like, so that point group data indicating a situation around the robot 7, a captured image, and the like are transmitted in real time to a remote location such as a monitoring center where the monitoring member is dispatched. Then, the monitoring member may navigate the robot 7 through the monitor at the remote location while referring to the above-described current position and map information M, and the like.

In some other embodiments, the above-described embodiments may be combined, and automatic navigation and manual navigation may be switched therebetween.

The ranging sensor 74 able to detect the presence of a moving object 9 movable in the target area, and a human detection sensor 75 able to detect the presence of a human being (a person; the same applies in the following) are mounted on the robot 7. The moving object 9 is an object other than an anchored object of a building, a device or the like, such as a human being, a vehicle or the like. The moving object 9 is an object that is not required to be moving all the time, and is allowed to stop temporarily.

The ranging sensor 74 may be a sensor able to find out the presence of an object on the periphery of the sensor based on the reflected light of the laser beams. Then, the ranging sensor 74 may be allowed to face various directions of the robot 7 by being mounted on the robot 7 via a gimbal mechanism such as a rotating platform.

The human detection sensor 75 may be an infrared camera or the like, which is a different type of sensor from the ranging sensor 74. Alternatively, the human detection sensor 75 may be the same type of sensor as the ranging sensor 74, such as the LiDAR, described above, and the ranging sensor 74 may also serve as the human detection sensor 75. Furthermore, the human detection sensor 75 may be constituted of a combination of a plurality of sensors, such as a combination of two sensors including the infrared camera and the ranging sensor 74, and the above-described combination may further include a visible light camera. Note that a captured image by the visible light camera may be transmitted to the monitoring member at the remote location.

Further, the robot 7 is equipped with an RFID reader/writer (hereinafter, simply referred to as a reader 76) configured to communicate with the radio tag 8 carried by a person authorized to enter the target area. Authentication information V is stored in a memory of the radio tag 8 carried by the authorized person. Then, when the radio tag 8 has received electromagnetic waves (or a magnetic field) transmitted from the reader 76 for wireless communication by RFID, the radio tag 8 transmits the authentication information V to the outside in order to transmit it to the reader 76.

In addition, the robot 7 may be further equipped with an alarm device 77, such as a speaker; in a case where it is determined that the moving object 9 is a human being, or the like, the robot 7 may output a voice command to urge the human being having been detected (hereinafter referred to as the detected person) to take an action necessary for the authentication at the current location; in a case where the detected person is determined to be a suspicious person, the robot 7 may output an alarm W, such as an alarm voice or alarm sound.

In the embodiment illustrated in FIG. 1, the robot 7 is a UGV, and the main body portion 71 thereof is equipped with the LiDAR as the ranging sensor 74, an infrared camera as the human detection sensor 75, the reader 76, and a visible light camera for enabling the watching of the periphery of the robot 7 by a monitoring member at the remote location. In other words, a monitoring device 61 is installed in a monitoring center, and the robot 7 and the monitoring device 61 are communicably connected each other via a communication network N, such as a LAN or WAN. More specifically, the robot 7 is further equipped with a wireless device 78 configured to communicate with, for example, a base station 6b (wireless AP) of WiFi (wireless LAN), a base station 6b of a mobile communication system (4G, 5G, or the like) or the like, so that the robot 7 is able to communicate with the monitoring device 61 via the base station 6b. The monitoring device 61 may be a computer apparatus connected to a notification device, such as a display, a speaker or the like, able to report a notification A, or may be a notification device.

However, the present invention is not limited to the present embodiment. The detection device 1 may not be configured to be movable, and may be installed at a predetermined location. In addition, the authorized person may not have the radio tag 8, but may carry a wireless communication device capable of short-range wireless communication such as infrared communication, Bluetooth (registered trademark) or the like; however, in this case, the wireless communication device becomes large in size and weight since a power source and the like are needed. Further, the control unit 73 may control the drive device 72 based on a command from a control device (not illustrated) installed in the communication network N, for example.

In the monitoring system 6, the detection device 1 is connected to each of the ranging sensor 74, the human detection sensor 75 and the reader 76, and detects an unauthorized person (suspicious person) entering the target area as described below.

Hereinafter, the detection device 1 will be described in detail using FIGS. 1 to 3.

Figure 2:
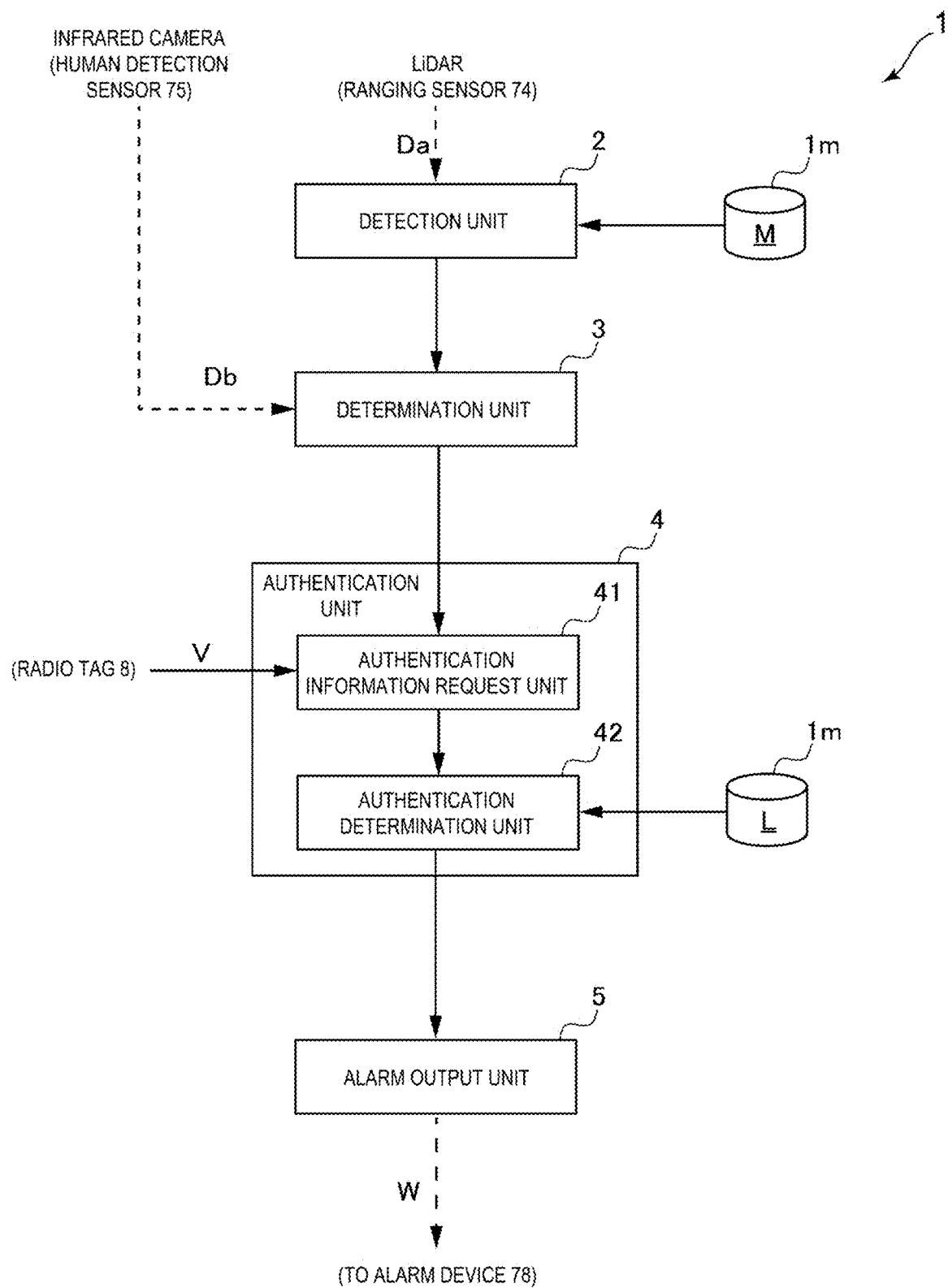
FIG. 2 is a diagram schematically illustrating a configuration of a detection device according to one embodiment of the present invention.

FIG. 2 is a diagram schematically illustrating a configuration of the detection device 1 according to one embodiment of the present invention.

The detection device 1 is a device configured to determine the presence or absence of the right of access to the interior of the target area of a person present in the target area, and in the embodiment illustrated in FIG. 2, the detection device 1 is also a device configured to detect a suspicious person having intruded into the target area. As illustrated in FIG. 2, the detection device 1 includes a detection unit 2, a determination unit 3, and an authentication unit 4.

Each of these functional units will be described below.

Note that the detection device 1 may be constituted of a computer. That is, a processor 1p (for example, a CPU) (not illustrated), a storage device 1m such as a ROM or RAM, and the like are included, and each of the above-described functional units is realized by the processor performing operations (such as data calculations) in accordance with instructions of a program (detection program 10) loaded on a memory (main storage device). To rephrase, the above-described program is software by which the computer realizes each of the functional units, which will be described later, and the program may be stored in a computer-readable storage medium.

The detection unit 2 is a functional unit configured to detect the moving object 9 by using the ranging sensor 74 described above. Specifically, in some embodiments, the detection device 1 may include the map information M of the target area, and the detection unit 2 may be configured to detect the presence of the moving object 9 based on a comparison between a detection result Da of the ranging sensor 74 and the map information M of the target area. The map information M may be information including a positional relationship of fixtures (installed objects), such as a building, a facility and the like, that are fixedly installed in the target area, and may be a three-dimensional map obtained by performing measurement with the ranging sensor 74 while traveling in the interior of the target area before starting the monitoring of suspicious persons.

Then, the moving object 9 may be detected by comparing the detection result Da being scan data or the like (point group data or the like) obtained by scanning the periphery with the ranging sensor 74, with a portion of the map information M corresponding to this scan data (three-dimensional information). That is, in a case where there is an object that is not present in the map information M, but is present in the scan data, the object may be detected as the moving object 9.

In some other embodiments, the moving object 9 may be found out by another method in which, for example, the moving object 9 is found out based on a comparison between a plurality of pieces of scan data captured at the same location at predetermined intervals, or the like.

The determination unit 3 is a functional unit configured to determine whether or not the detected moving object 9 is a human being by using the human detection sensor 75 when the moving object 9 is detected by the detection unit 2. For example, in a case where the human detection sensor 75 is an infrared camera or the ranging sensor 74, the above-described determination may be performed based on at least one of a shape of temperature distribution (Db) in a thermal image (Db) obtained by the infrared camera, for example, a shape of the object contained in point group data or the like obtained by the ranging sensor 74. For example, a learning model capable of outputting a determination result of whether or not the detected object is a human being from at least one of the shape of the temperature distribution or the shape of the object may be used. In this case, when the detection result Db of the human detection sensor 75 is input into the learning model, a determination result of whether or not the detected object is a human being may be output. Further, by making the above-described determination based on the detection results (Da, Db) of the plurality of sensors, it is possible to improve determination accuracy in such a manner that the moving object 9 is determined to be a human being when both of the detection results indicate that the moving object 9 is a human being, for example.

The authentication unit 4 is a functional unit configured to authenticate the moving object 9 in a case where the determination unit 3 determines that the detected moving object 9 is a human being (detected person). Specifically, the authentication unit 4 includes an authentication information request unit 41 configured to request the moving object 9 to transmit authentication information V by wireless communication, and an authentication determination unit 42 configured to determine whether or not the moving object 9 has the right of access to the interior of the target area, in which the moving object 9 is present at the time of authentication, based on a result of the wireless communication.

The above-described authentication information V may be ID information individually identifying a person, a division to which the person belongs, or the like, or may be authorization information indicating the permission. The determination method by the authentication determination unit 42 may be a known method. For example, as in a whitelist method or the like, in a case where authorized persons or authorization information of the target area is previously registered, and the authentication information V itself or the information obtained based on the authentication information V matches the registered information (hereinafter, authorized person registration information L), it is determined that the detected object is an authorized person (successful authentication), and it is determined that the detected object is not an authorized person in the case of the registered information not being matched (unsuccessful authentication). In the case of the moving object 9 not being an authorized person, this moving object 9 is a suspicious person not having the right of access to the interior of the target area in which the moving object 9 is present at the time of authentication.

Specifically, the authentication information request unit 41 requests the authentication information V from the moving object 9 by requesting wireless communication from the installed communication equipment, such as requesting the reader 76 to radiate electromagnetic waves. In the embodiment illustrated in FIGS. 1 and 2, the authentication information request unit 41 is configured to request the radio tag 8 to transmit (reply) the authentication information V by performing wireless communication utilizing RFID with respect to the radio tag 8 owned by the detected moving object 9 (detected person). As a result, the electromagnetic waves for the wireless communication utilizing RFID are transmitted from the reader 76 toward the detected person. On the other hand, the radio tag 8 receives the electromagnetic waves with a built-in antenna, and transmits the authentication information V recorded (stored) in a memory (storage unit) included in the radio tag 8 from the built-in antenna by power generated based on the received electromagnetic waves. Then, the authentication unit 4 acquires the authentication information V received by the reader 76.

On the other hand, the authentication determination unit 42 determines whether or not the authentication information V received from the radio tag 8 is present in the authorized person registration information L stored in the storage device 1m of the detection device 1, determines that a holder of the radio tag 8 having transmitted the authentication information V is an authorized person when the presence is confirmed, and determines that the radio tag holder is a suspicious person when the presence is not confirmed. The authentication determination unit 42 may make a determination for each sub-area included in the target area as will be described later.

In addition, in a case where the authentication information V is not received (acquired) in response to the request for transmission by the authentication information request unit 41, such as a case in which the authentication information V has not been received even after a predetermined amount of time has passed since the reader 76 transmitted the electromagnetic waves, the authentication determination unit 42 determines that the detected person does not have the right of access to the interior of the target area where the detected person is present at the time of authentication (the detected person is a suspicious person). Examples of the case in which the authentication information V cannot be obtained in response to the request as described above may include a case in which the detected person does not have the radio tag 8, and a case in which the radio tag 8 is present outside a range where the wireless communication can be performed (outside a range where the reading by the reader 76 is possible to be done). In the monitoring system 6, each authorized person is assumed to carry the radio tag 8; thus, in this case, it can be determined that the detected moving object 9 is not an authorized person because the detected moving object 9 does not carry the radio tag 8.

Note that, to deal with a case of the authentication being performed outside the region where wireless communication can be performed, a case of poor electromagnetic wave environment, and the like, the authentication determination unit 42 may instruct the moving object 9 to take an action causing the radio tag 8 to approach (touch) the reader 76 by, for example, a voice command using voice or a screen command displayed on the monitor; then, in a case where the requested command is not performed, the authentication determination unit 42 may determine that the detected person is a suspicious person. The voice command may be issued by an alarm output unit 5, which will be described below. This makes it possible to suitably determine whether or not the detected person is a suspicious person. It is sufficient that at least one of the voice command or the screen command is performed, but it is also sufficient that both the commands are performed in preparation for a case in which a worker may not hear the voice command given by the robot 7 in an environment where noise is generated, or the like.

In the embodiment illustrated in FIG. 1, the detection device 1 further includes the alarm output unit 5 configured to output the alarm W in a case where it is determined that the moving object 9 found out by the authentication unit 4 does not have the right of access (is a suspicious person). The alarm output unit 5 is connected to each of the authentication unit 4 and the alarm device 77, and outputs the alarm W to the alarm device 77 when an authentication result by the authentication unit 4 is input thereto. In the embodiment illustrated in FIG. 1, the alarm device 77 is a speaker, and gives a warning to a suspicious person by outputting a predetermined alarm voice or alarm sound (alarm) as the alarm W. The alarm device 77 transmits a notification A telling the detection of a suspicious person to the monitoring device 61 connected with the alarm device 77 via the communication network N.

However, the present invention is not limited to the present embodiment. In the embodiment described above, the determination based on the authentication information V is performed on the robot 7 side, but in some other embodiments, the determination may be made by using an authentication device (not illustrated) connected to the communication network N. That is, information for authenticating the authentication information V such as a list (whitelist) in which the authorized persons of the target area are registered is stored in the authentication device, and the authentication information V is transferred from the detection device 1 to the authentication device and an authentication result by the authentication device is replied, whereby the determination of whether or not the detected person is a suspicious person may be made. In this case, the robot 7 is equipped with a wireless device configured to communicate with the above-described base station or the like, and communicates with the authentication device via the base station.

According to the above-described configuration, after the detection of the moving object 9 such as a human being or an object moving in the target area in a plant or the like, or a movable temporary load by using, for example, the ranging sensor 74 being the LiDAR or the like, it is determined whether or not the detected moving object is a human being by using, for example, the human detection sensor 75 such as an infrared sensor. Then, in the case where the moving object 9 is a human being, wireless communication is performed with, for example, the radio tag 8 for authentication assumed to be carried by the moving object 9, thereby performing the authentication. In other words, the ranging sensor 74 such as the LiDAR is able to find out a farther distanced object than in a case of using infrared rays, and first detects the moving object 9 and then determines whether or not it is a human being. This makes it possible to suitably detect the moving object 9 even when the moving object 9 is present at night or travels at high speed. Furthermore, by determining whether or not the detected moving object 9 is a human being, it is possible to prevent an erroneous detection from occurring in which the moving object 9 other than a human being, who should not have the radio tag 8, is taken as a suspicious person.

In the case where the moving object 9 is a human being, the above-described scheme may widely handle various situations including a case of a plant where a target area has the above-described conditions, for example, by performing authentication through wireless communication on the radio tag 8 or the like being carried by the moving object 9. In other words, according to the configuration described above, in the case where the moving object 9 is a human being, since authentication can be performed through wireless communication with a radio tag or the like without performing face authentication (image recognition) or voice authentication, it is possible to perform authentication regardless of the wearing condition of a protector, the face orientation of the human being and the magnitude of the noise, thereby making it possible to suitably detect a suspicious person.

Next, several other embodiments regarding the above-described detection device 1 will be described using FIGS. 3 and 4.

FIG. 3 is a diagram illustrating a relationship between a security level and access authority according to one embodiment of the present invention.

In some of the above-described embodiments, in order to perform authentication based on an idea as illustrated in FIG. 3, for example, the authentication performed by the authentication unit 4 may be such that a plurality of sub-areas are set in the target area (see FIGS. 5 and 6 to be described below) and the authentication is performed on each of the sub-areas by using, for example, authorized person registration information L created for each sub-area. Specifically, when the authentication information V has been acquired, the authentication determination unit 42 determines, based on the current position of the robot 7 and the map information M, a position at which the detected person is present, and also determines where the sub-area to which the position belongs is located. Then, the authorized person registration information L corresponding to the determined sub-area may be acquired from the storage device 1m.

FIG. 3 is a diagram illustrating a relationship between a security level and access authority according to one embodiment of the present invention. In the example described in FIG. 3, the target area is classified into a plurality of sub-areas in accordance with security levels indicating importance of security ("high", "middle", and "low" in FIG. 3). And, access authority (three levels of "high", "middle", and "low" in FIG. 3) corresponding to the classification in accordance with the security levels is set for the people who may enter into the target area. Specifically, as illustrated in FIG. 3, security levels of three stages are set, and any of the access authority in three stages is assigned to a person concerned of the target area such as a member of the company staff. Then, whether or not it is allowed to enter any sub-area is determined depending on whether the access authority level is equal to or larger than a security level of the sub-area, and only the people assigned with the access authority levels equal to or larger than the security level are authorized people of the sub-area. In an area where no security level is set (for example, a road or the like), even the people concerned having the lowest access authority become authorized people, but outsiders, defined as people other than the people concerned, are each determined to be a suspicious person in any of the target areas because no access authority is assigned thereto.

According to the above-described configuration, for each sub-area included in the target area, it is possible to determine whether the detected person is an authorized person (a member of the people concerned) or a suspicious person (an outsider) in accordance with the security levels, for example, thereby making it possible to detect a suspicious person for each sub-area.

Figure 4:
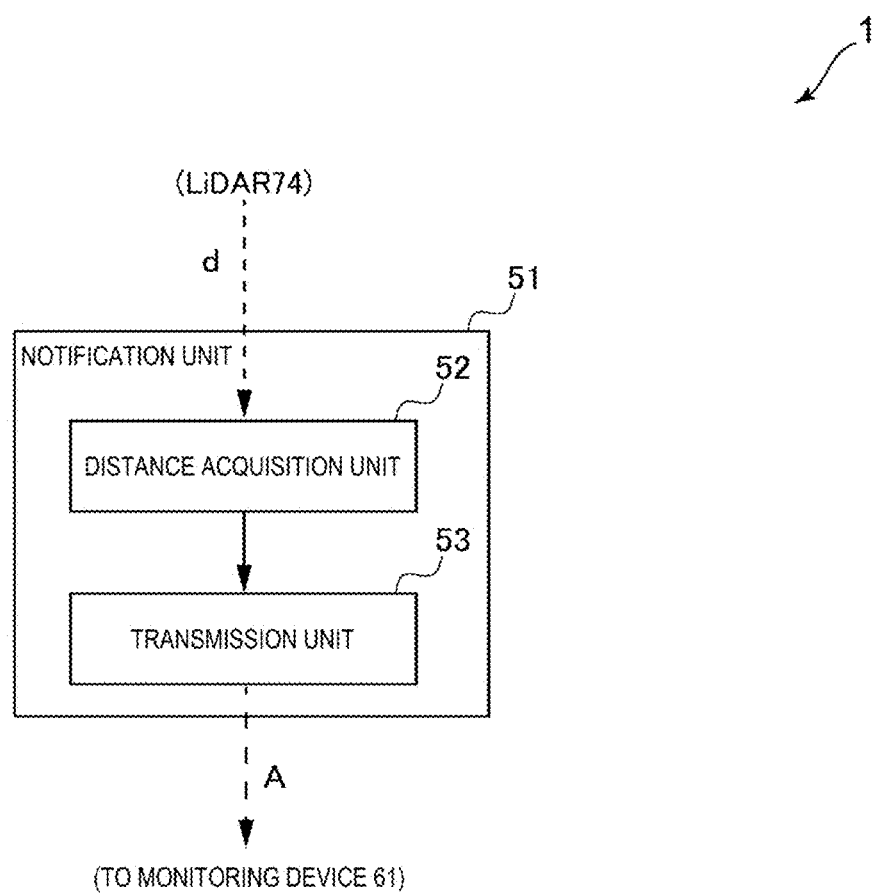
FIG. 4 is a diagram schematically illustrating a configuration of a notification unit included in a detection device according to one embodiment of the present invention.

FIG. 4 is a diagram schematically illustrating a configuration of a notification unit 51 included in the detection device 1 according to one embodiment of the present invention.

In some embodiments, the detection device 1 may be configured to output a notification A to a monitoring member or the like, regardless of whether or not authentication is performed and regardless of the result of the authentication, when the detected person (moving object 9) behaves in a manner in which he or she looks like running away. Specifically, in some embodiments, the detection device 1 may determine the behavior, which looks like running away, of the detected person based on a distance d between the detection device 1 (robot 7) and the suspicious person.

Specifically, as illustrated in FIG. 4, the detection device 1 may further include a notification unit 51 configured to report a notification A telling that a predetermined behavior has been detected, such as a behavior of the detected person that looks like running away, to the outside such as the monitoring device 61. The notification unit 51 includes a distance acquisition unit 52 configured to acquire the distance d to the moving object 9 (the detected person) detected by the detection unit 2, and a transmission unit 53 configured to transmit the notification A based on the distance d.

The distance d may be measured by the ranging sensor 74 described above. The distance acquisition unit 52 acquires the distance d measured by the ranging sensor 74. Then, the transmission unit 53 may compare a threshold value with the acquired distance d itself or a distance-related value being a movement velocity or the like that can be calculated based on the acquired distance d, and when the distance-related value is not less than the threshold value, the transmission unit 53 may consider the behavior of the suspicious person as a running-away behavior and may notify this to a monitoring member dispatched at the outside or the like. The calculation of the movement velocity can be made by determining an amount of change in the distance d at two optional times, by measuring the distance d periodically or the like with the ranging sensor 74. In addition, at the same time, the alarm output unit 5 may output the alarm W from the alarm device 77 mounted on the robot 7 with respect to the suspicious person taking the above-described behavior of running away.

According to the above-described configuration, the behavior of the detected person (moving object 9) is monitored based on the distance d between the detection device 1 (robot 7) and the moving object 9. This makes it possible to detect behavior of the detected person that looks like running away and notify an administrator. Thus, a person taking such behavior may be detected as a suspicious person even before performing authentication.

Next, several other embodiments regarding the control unit 73 included in the robot 7 will be described using FIGS. 5 and 6.

Figure 5:
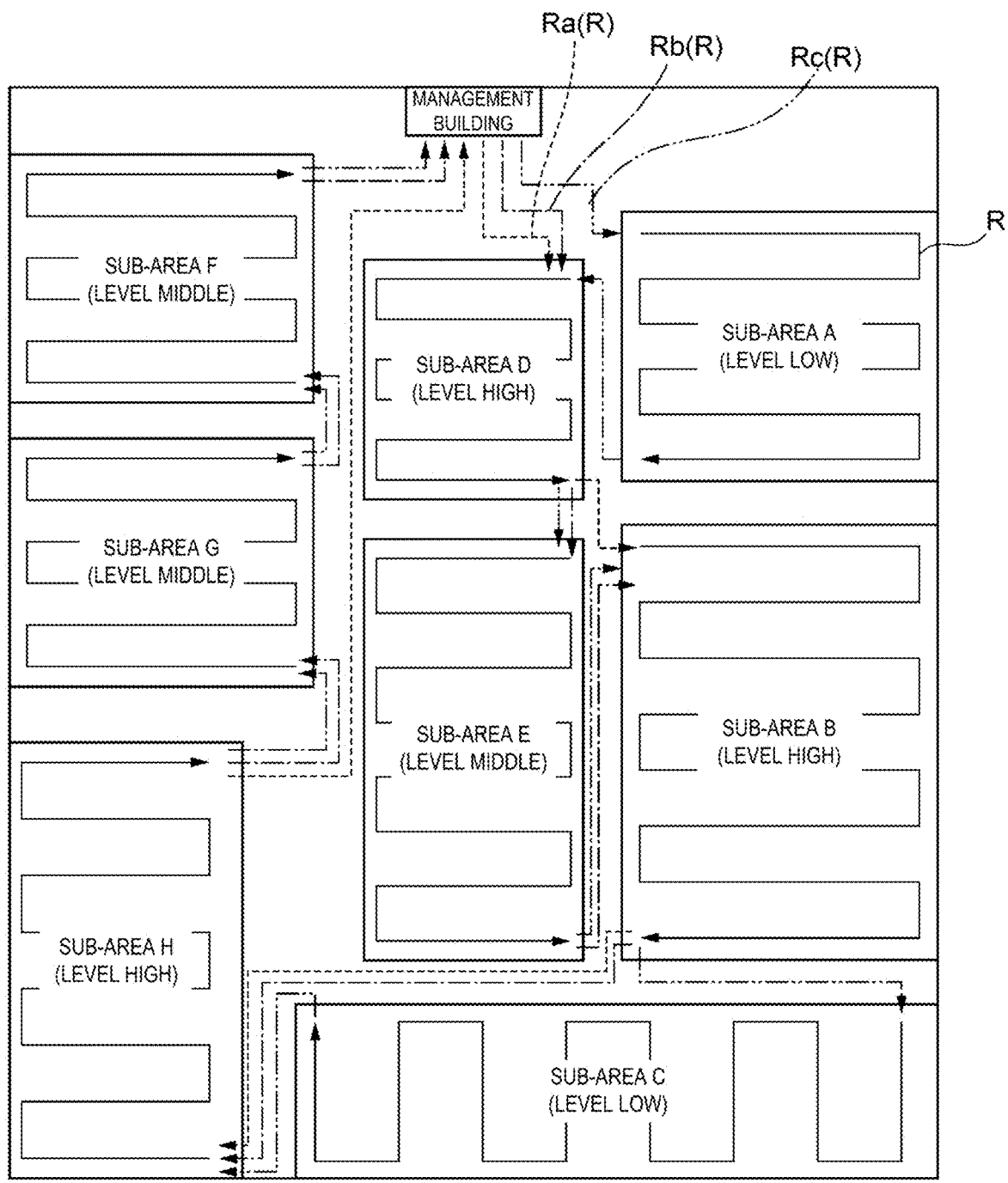
FIG. 5 is a diagram illustrating an example of a target area constituted of a plurality of sub-areas and a movement route according to one embodiment of the present invention.

FIG. 5 is a diagram illustrating an example of a target area constituted of a plurality of sub-areas and a movement route R according to one embodiment of the present invention.

As described above, the robot 7 moves in the target area along the set movement route R. At this time, when a period of time in which the movement route R is fixed is long, the time when the robot 7 passes through any location in the target area is easy to estimate, so that it is likely to be easy for a person other than the authorized person to intrude into the target area.

Thus, in some embodiments, as illustrated in FIG. 5, a plurality of sub-areas may be set in the target area, and a plurality of movement patterns P for moving in order through at least some sub-areas among all the sub-areas set in the target area may be defined. The plurality of movement patterns P differ from one another in that at least one of any sub-area included in the movement pattern, a movement sequence of the sub-areas, or a movement velocity for each sub-area. All the movement velocities may be the same in the target area, or the movement velocity in some sub-areas may be different from that in the other sub-areas. Then, any of the plurality of movement patterns P may be selected, and the movement pattern P (movement route R) may be changed every time all the movements in the movement route R corresponding to the selected movement pattern P are finished, or may be changed after the movement of one movement pattern P has been performed a predetermined number of times.

More specifically, the robot 7 further includes a selection unit 79 configured to select one movement pattern P from among the plurality of movement patterns P in accordance with a predetermined logic. And, the control unit 73 may be configured to control the drive device 72 in accordance with the movement pattern P selected by the selection unit 79. Then, since the movement routes R are associated with the movement patterns P respectively, when the selected movement pattern P is selected, the movement route R is selected. That is, the selection of the movement pattern P is the same as the selection of the movement route R.

Alternatively, the selection unit 79 may randomly select the plurality of movement patterns P, or may select the movement patterns in a predetermined sequence such as an order assigned to each movement pattern P, for example. The timing of the selection performed by the selection unit 79 may be every day, every few days, every predetermined time, every predetermined time zone, every time when a predetermined number of patrols are carried out in the target area, or the like. When the selection unit 79 selects, after having finished one movement pattern P, the next movement pattern P based on a predetermined selection sequence of the plurality of movement patterns P, the movement velocity when moving along each movement pattern P may be changed to differ from each other, thereby making it difficult for the intruder to estimate a passage time of the robot 7.

The movement patterns P may be created while taking security levels into consideration. Specifically, as illustrated in FIG. 5, a security level is set for each of the plurality of sub-areas included in the target area. Further, as the movement pattern P, a movement pattern including only such sub-areas that have a predetermined security level or only such sub-areas that have a security level equal to or higher than the predetermined security level may be created, and the movement sequence may be defined while taking the security levels into consideration in such a manner that, for example, a sub-area having a higher security level is approached earlier. The same sub-area may be included a plurality of times in the movement pattern P. In addition, the movement pattern P may be created in the same manner as described above, while taking into consideration the degrees of risk of the sub-areas rather than the security levels. Alternatively, the movement pattern P may be created taking into consideration both the security levels and the degrees of risk of the sub-areas.

In the embodiment illustrated in FIG. 5, the target area includes a total of eight sub-areas (A to H), in which any of the security levels of "high", "middle", and "low" is set. There are prepared beforehand at least three movement patterns P including a first movement pattern Pa, in which only the sub-areas having a high security level (B, D and H) are patrolled, a second movement pattern Pb, in which only the sub-areas having high and middle security levels (high: B, D and H, Middle: E, F and G) are patrolled, and a third movement pattern Pc, in which all the sub-areas (all the sub-areas having the high, middle, and low security levels) are patrolled. Each movement pattern P is set such that it starts from a management building having a warehouse of the robot 7, passes through the target sub-areas in order, and then returns to the management building.

Note that the monitoring is performed by the detection device 1 not only in each sub-area but also on a movement path between the sub-areas.

According to the configuration described above, the robot 7 moves in accordance with the movement pattern P selected from among the plurality of movement patterns P. This makes it difficult for a person not allowed to enter the target area or sub-area to estimate the movement route R of the robot 7 and a passage time of the robot 7 at any position, thereby making it possible to enhance an effect of prevention of the intrusion.

Figure 6:
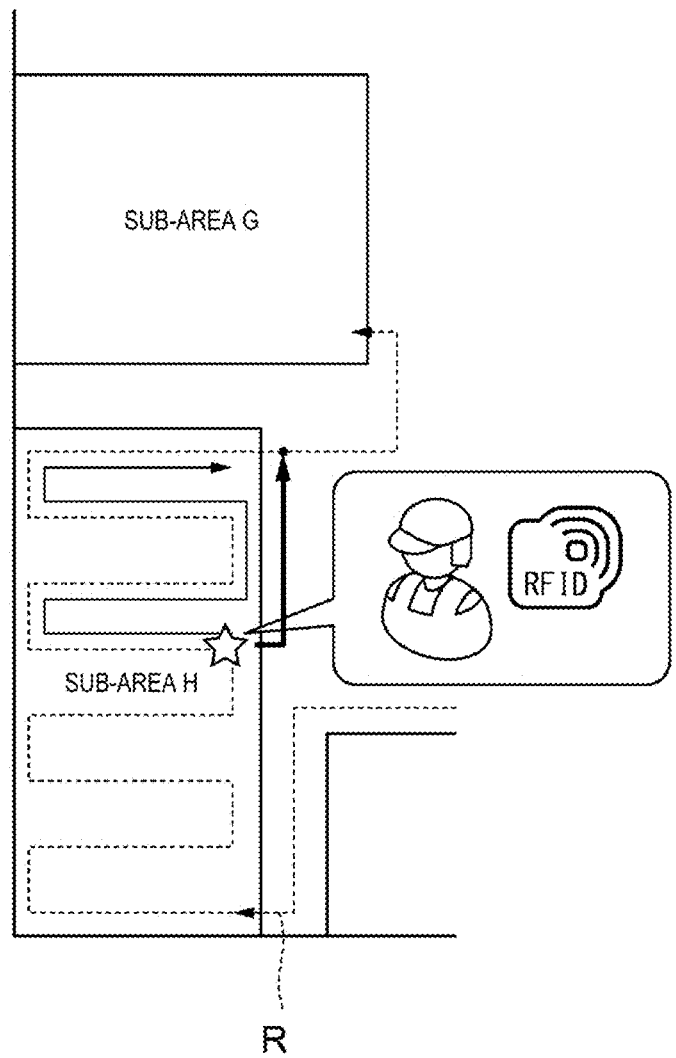
FIG. 6 is a diagram for explaining a difference in a movement path of a robot between a simple patrol mode and a detail patrol mode at a time of successful authentication according to one embodiment of the present invention.

FIG. 6 is a diagram for explaining a difference in a movement path of the robot 7 between a simple patrol mode and a detail patrol mode at a time of successful authentication according to one embodiment of the present invention.

In the embodiment described above, it is described that the detection device 1 determines basically all the detected people (detected persons) whether or not they are suspicious persons, but in this case, the time needed to patrol the interior of the target area becomes longer as the number of persons present in the target area is larger. However, there may be such a case that a large number of workers are present in the target area when constructing a new building, for example, but a requirement for the security against the intrusion of a suspect person is low in some cases. In a case of construction in a dangerous area or the like, although the degree of risk against the workers is high, a requirement for the security may be low in some cases. Furthermore, even when there is a high security requirement, in a case where a large number of workers are gathered during the day in some operation, construction, or the like, the presence of a suspicious person is generally noticed by the workers therein, so that it may be better in some cases to monitor suspicious persons in other sub-areas than to perform authentication on all the people present in the sub-area where the large number of workers are gathered.

Thus, in some embodiments, the authentication unit 4 (the detection device 1) may be configured to execute processing corresponding to each of the plurality of patrol modes. For example, there may be at least two patrol modes including the detail patrol mode in which the authentication of each of all the moving objects 9 is performed and the simple patrol mode in which the authentication is finished when the authentication of the moving object 9 detected first is successful. The patrol mode may be allowed to be set for each sub-area.

With this, as illustrated in FIG. 6, in the case where the detection device 1 is mounted on the robot 7, the authentication unit 4 may be configured to finish the authentication in the sub-area where the simple patrol mode is set when the authentication of a person detected first therein is successful. When the authentication in the sub-area is finished, as a result, the moving object 9 moves to the next objective area, such as the next sub-area, warehouse or the like. Note that, at this time as well, the detection device 1 executes the processing for detecting a suspicious person.

Specifically, the setting of the patrol mode performed on the authentication unit 4 may also be reflected on the robot 7 side (the control unit 73). Alternatively, a command to move to the next objective area may be given by the detection device 1. With this, the control unit 73 may control the drive device 72 to search for the shortest path through which movement to the objective area is possible, for example, based on the current position and the map information M regardless of whether or not to pass through the remaining path in the sub-area where the authentication has been finished, and move to the next objective area along the found path (see FIG. 6).

In the embodiment illustrated in FIG. 6, the detection and the authentication of the first moving object 9 (worker) are performed at a position with a star mark in the sub-area H, and a case of successful authentication is illustrated. In addition, the movement route R is a line indicated by a dotted line. At this time, in the case where the simple patrol mode is set, the authentication in the sub-area H is finished, and the robot 7 moves therefrom directly to the next sub-area G while passing through a path indicated by a thick line in FIG. 6. In the example in FIG. 6, from a point of the sub-area where the authentication has been finished, the robot 7 moves while temporarily departing from the movement route R (the processing for detecting a suspicious person is executed during this movement), and meets the movement route R again near an outlet of the sub-area and then moves toward the next sub-area G. The robot 7 may move to the next sub-area G while passing through another path, for example, taking the shortest path. Conversely, in the case where the detail patrol mode is set, the processing for detecting a suspicious person is executed while continuously moving in the sub-area H along the movement route R, as indicated by a thin line in FIG. 6. In other words, after passing through the sub-area H along the predetermined movement route R, the robot 7 moves to the next sub-area G.

In the configuration described above, the authentication unit 4 is configured to execute the processing in accordance with the set patrol mode, and when the authentication of the first detected person is successful in the case of the simple patrol mode being set, the authentication in that sub-area is finished. For example, although many people, such as workers, may be present in some sub-areas, there is a case in which necessity for individually performing authentication on each person is low. In such case, by performing authentication on the first single person, the authentication in that sub-area is finished. This makes it possible to prevent a situation from occurring in which a considerably large amount of time is needed to detect a suspicious person in a certain sub-area and consequently a larger amount of time than expected is needed for the robot 7 to move across the whole target area, thereby making it possible to suitably detect suspicious persons in the whole target area.

Furthermore, in some embodiments, as illustrated in FIG. 1, the robot 7 may further include a check execution unit 7a configured to run a check on the interior of the target area by using a sensor including at least one of the ranging sensor 74 or the human detection sensor 75. For example, in the case where the human detection sensor 75 is an infrared camera, the temperature of a check point can be measured, and it is possible to check the presence or absence of the leakage in the equipment. When the human detection sensor 75 includes a visible light camera, it is also possible to read a meter installed in the target area, or the like. In addition, when a detection value of a sensor installed in the target area is transmitted by the radio tag 8 connected to the sensor, it is possible to acquire a detection result of the sensor by using the reader 76 mounted on the robot 7.

Moreover, the robot 7 may include an array microphone or an odor sensor to be used for check operation, which makes it possible to detect abnormal sound, patrol and check the leakage of gas, or the like. In the present embodiment, the movement route R is set in such a manner as to pass through the check points that need to be patrolled.

According to the configuration described above, the robot 7 is configured so as to be able to check the interior of the target area and detect a suspicious person at the same time. In this manner, since the robot 7 both checks the target area and detects a suspicious person (patrol), these check and detection operations can be performed by the single robot 7 without using a suspicious-person detection (patrol) robot and a check robot separately.

A detection method corresponding to the processing of the detection device 1 will be described below using FIGS. 7 and 8.

Figure 7:
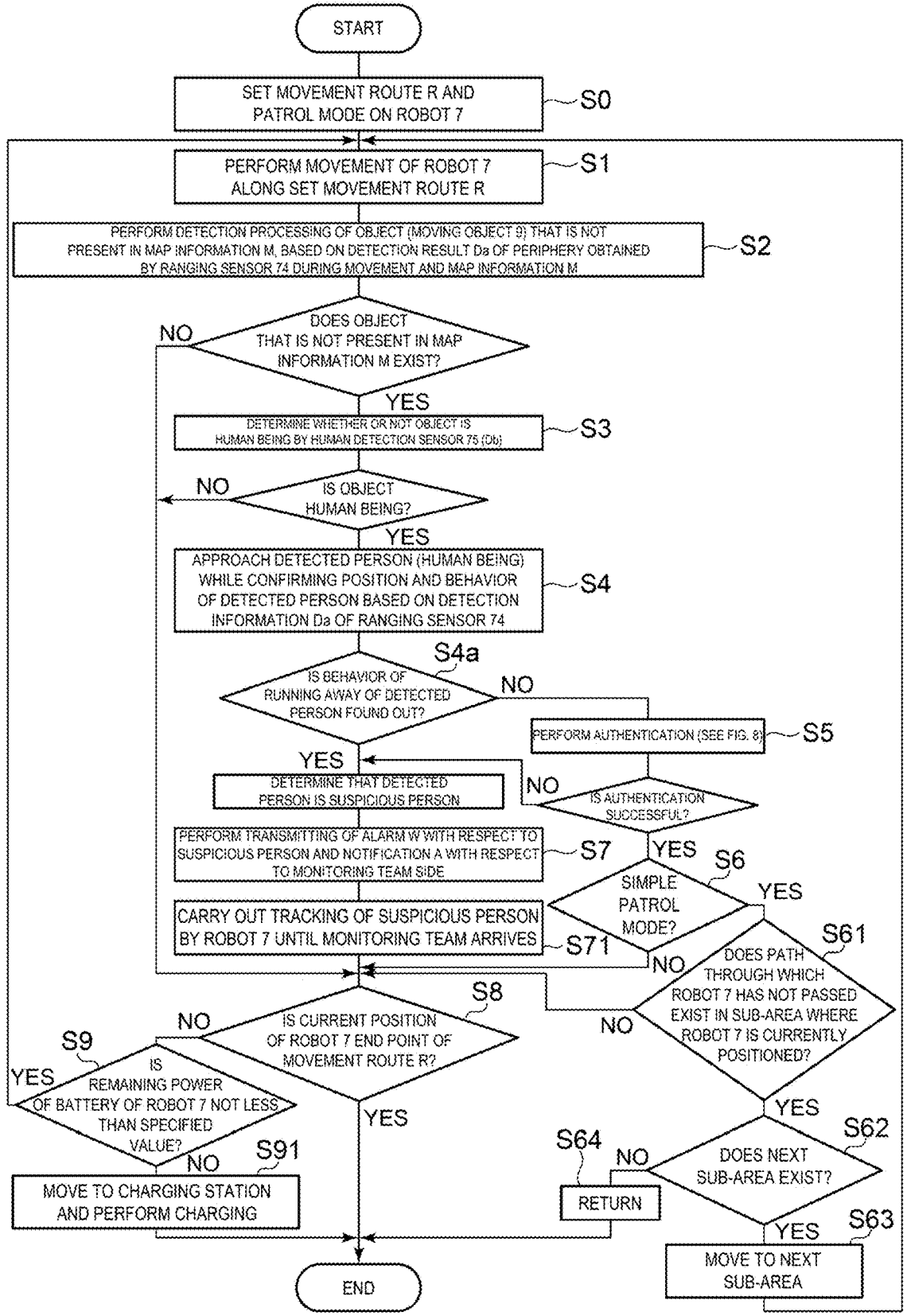
FIG. 7 is a diagram illustrating a detection method according to one embodiment of the present invention.
Figure 8:
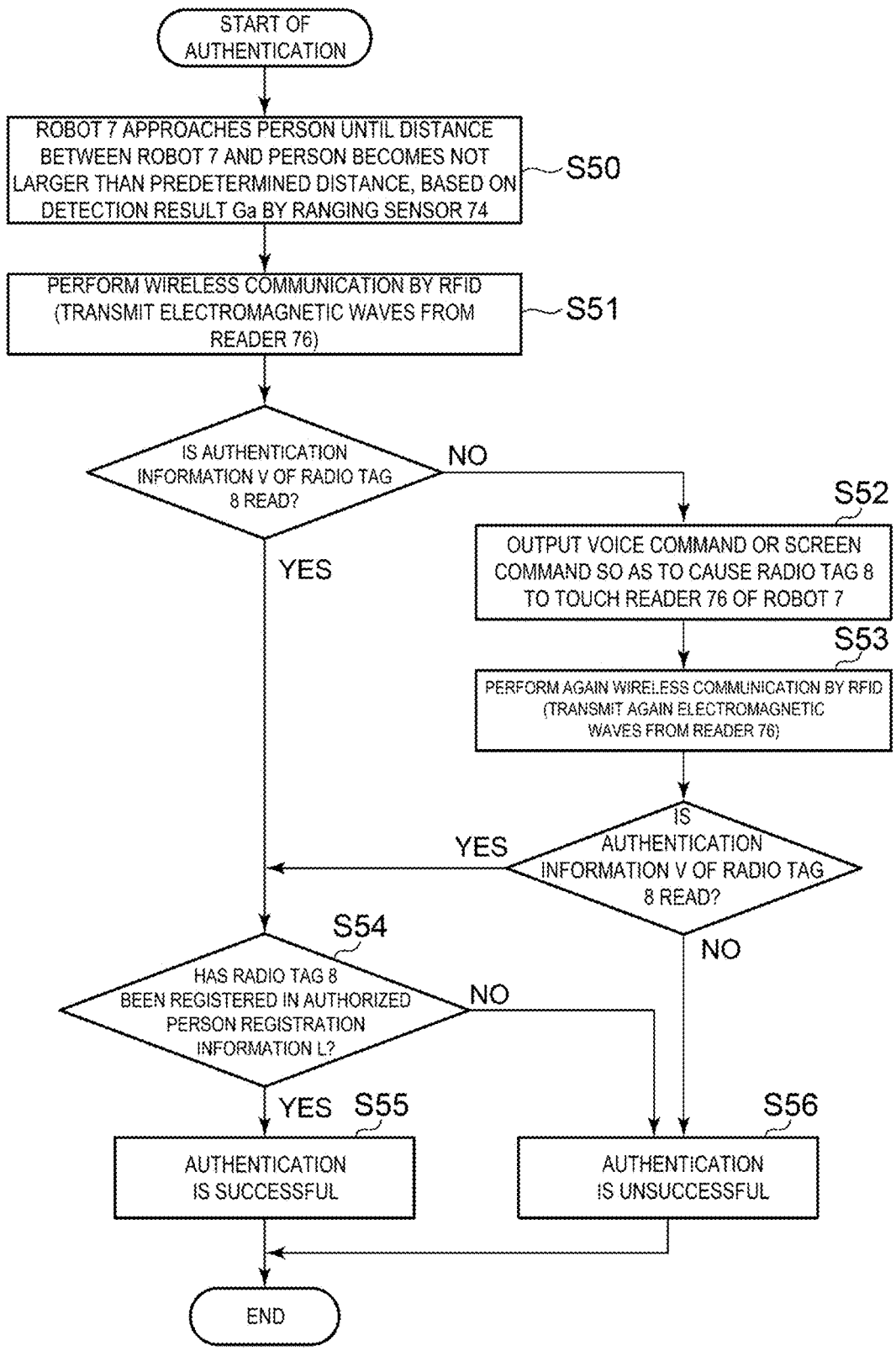
FIG. 8 is a diagram illustrating an authentication step according to one embodiment of the present invention, and is a detailed description of step S5 in FIG. 7.

FIG. 7 is a diagram illustrating a detection method according to one embodiment of the present invention. In addition, FIG. 8 is a diagram illustrating an authentication step according to one embodiment of the present invention, and is a detailed description of step S5 in FIG. 7.

The detection method is a method for detecting a suspicious person in a target area. As illustrated in FIG. 7, the detection method includes a detection step (S2) for detecting the moving object 9 by using the ranging sensor 74, a determination step configured to determine, when the moving object 9 is detected by the detection step, whether or not the detected moving object 9 is a human being by using the human detection sensor 75, and an authentication step configured to authenticate the moving object 9 when it is determined that the detected moving object 9 is a human being. Then, as illustrated in FIG. 8, the authentication step includes an authentication information request step (S51) configured to request the moving object 9 to transmit the authentication information V by wireless communication, and an authentication determination step (S52 to S56) configured to determine whether or not the moving object 9 has the right of access to the interior of the target area, in which the moving object 9 is present at the time of authentication, based on a result of the wireless communication.

The detection step, determination step, and authentication step are similar to the processing contents respectively executed by the aforementioned detection unit 2, determination unit 3, and authentication unit 4, and thus detailed description thereof will be omitted.

In addition, in some embodiments, as illustrated in FIG. 7, the detection method may further include an alarm output step (S7) configured to output the alarm W in a case where the authentication step determines that the moving object 9 is a suspicious person. The alarm output step is similar to the processing content executed by the aforementioned alarm output unit 5, and thus detailed description thereof will be omitted.

In some embodiments, as illustrated in FIG. 7, the detection method may further include a notification step (S7) configured to perform notification to the outside. The notification step may be configured to include a distance acquisition step configured to acquire a distance d to the moving object 9 (the detected person) detected by the detection step, and a transmission step configured to transmit the notification A based on the acquired distance d. The notification step is similar to the processing content executed by the aforementioned notification unit 51, and thus detailed description thereof will be omitted.

The detection method will be described in order of the steps in FIG. 7. A flow illustrated in FIG. 7 corresponds to a case in which the robot 7 is used for monitoring the presence or absence of a suspicious person in the target area. The robot 7 is stored in a warehouse, and starts its movement (patrol) from the warehouse for detecting a suspicious person in the target area and returns to the warehouse after having moved along the movement route R, thereby completing a single patrol along the movement route R. That is, the warehouse is the start point and is also the end point of the movement route R. Further, the target area includes a plurality of sub-areas, and for each sub-area, authorized persons allowed to enter the sub-area on that day or the like are registered in advance, for example. Furthermore, the robot 7 is equipped with, at least, the LiDAR (ranging sensor 74), a visible light camera, an infrared camera (human detection sensor 75), and a GNSS.

In step S0 in FIG. 7, preparations such as setting the movement route R, the patrol modes, and the like are performed on the robot 7. Specifically, as described earlier, the plurality of movement patterns for the movements in the target area are prepared in advance, and one movement pattern is selected from among the plurality of movement patterns based on a predetermined logic (a selection step corresponding to the processing of the selection unit 79). The patrol modes include the detail patrol mode and the simple patrol mode, and any of them is selected. Then, the selected movement pattern and patrol mode are set on the robot 7.

Next, in step S1, the robot 7 is moved along the set movement route R. Specifically, in the present embodiment, the robot 7 includes the map information M of the interior of the target area, and autonomously moves along the movement route R while confirming the positions in the map information M based on the positional information obtained by the GNSS. In step S2, the detection step is performed, then the map information M and the detection result Da of the periphery acquired by the ranging sensor 74 during the movement are sequentially compared with each other, and based on the comparison, the finding-out processing of a new object (moving object 9; the same applies hereinafter) that is not present in the map information M is performed.

Then, in a case where it is determined that a new object is present as a result of the detection processing in step S2, the determination step is performed in step S3, and whether or not the object detected in step S2 is a human being is determined. As a result, when the detected object is a human being, the robot 7 approaches the detected person in step S4 (following mode) while confirming the distance d from the detected person measured based on the detection result Da of the LiDAR and the behavior thereof (distance acquisition step). At this time, in a case where the behavior of the detected person that looks like running away is detected based on the distance d, it is determined that the detected person is a suspicious person, and the process moves to step S7. In step S7, the alarm W with respect to the suspicious person and the notification A with respect to a monitoring team side are transmitted (transmission step). Thereafter, in step S71, the tracking of the suspicious person by the robot 7 is carried out until the monitoring team arrives at the site. When the monitoring team arrives at the site, the robot 7 returns to the movement toward the movement route R (the process moves to step 8 to be described later).

On the other hand, in step S4, in a case where the behavior of the detected person that looks like running away is not detected, when the robot 7 comes close to the detected person at a distance at which wireless communication with the radio tag 8 carried by the detected person can be performed, the authentication step is performed in step S5 (see FIG. 8 to be described later). As a result, when the authentication is unsuccessful, it is determined that the detected person is a suspicious person, and the process moves to step S7 described above. Conversely, when the authentication is successful in step S5, the set patrol mode is checked in step S6, and in the case of not the simple patrol mode (in the case of the detail patrol mode), the process moves to step S8 (to be described later).

On the other hand, in the case where the patrol mode is the simple patrol mode, it is determined in step S61 whether or not there exists a path through which the robot 7 has not passed in the sub-area where the robot 7 is currently positioned, based on the current position and the map information M. As a result, in the case where there exists a path in the sub-area through which the robot 7 has not passed, it is determined in S62 whether or not there exists a next sub-area (unvisited sub-area), and when there exists such sub-area, the robot 7 moves to the next sub-area in step S63. Note that the detection processing by the detection device 1 is also performed during this movement. Thereafter, the process returns to step S1. In contrast, when there exists no next sub-area (the current position of the robot 7 is in the last sub-area in the movement route R, on which the detection processing is being performed), the robot 7 returns to the warehouse in step S64 and then the patrol along the movement path R is finished (the flow is ended).

Further, in the case where, in step S61, any path through which the robot 7 has not passed is not present in the sub-area where the robot 7 is currently positioned, the process moves to step S8 (to be described later). Furthermore, in the case where it is determined that no new object is present as a result of the detection processing in step S2 described above, or in the case where the object detected in step S3 is not a human being, the process moves to step S8 (to be described later).

And, in step S8, it is determined whether or not the current position is an end point of the movement route R, and when it is not the end point, it is determined in step S9 whether or not the remaining power of the battery of the robot 7 is not less than a specified value. Then, in the case where the remaining power of the battery of the robot 7 is not less than the specified value, the process returns to step S1 to continue the movement along the movement route R. In contrast, in the case where the remaining power of the battery of the robot 7 is less than the specified value, the robot 7 moves to a preset charging station and the battery is charged. In the present embodiment, the charging station is provided in the warehouse (start point), and the flow is ended when the charging is completed.

Note that in the flow illustrated in FIG. 7, when the result of step S2 is NO, the process moves to step S8, but may return to step S1. Likewise, when the result of step S3 is NO, the process moves to step S8, but may return to step S1.

Next, the authentication step (S5) will be described along the flow in FIG. 8. The flow illustrated in FIG. 8 corresponds to the detailed flow of step S5 in FIG. 7.

First, in step S50, by confirming the distance d between the robot 7 and the detected person based on the detection result Da by the LiDAR, the robot 7 is made to approach (move toward) the detected person in such a manner that the distance d becomes not larger than a predetermined distance (for example, 2 m) set to be not larger than the maximum distance at which the wireless communication between the reader 76 and the radio tag 8 can be performed. Thereafter, in step S51, the wireless communication by the RFID is performed. Specifically, electromagnetic waves or a magnetic field (electromagnetic waves in FIG. 8) is transmitted from the reader 76 toward the detected person.

As a result, when the reader 76 is able to read the authentication information V stored in the radio tag 8, the process proceeds to step S54 to be described below. Conversely, when the reader 76 is unable to read the authentication information V stored in the radio tag 8, a voice command or a screen command is given, in step S52, telling the detected person to make the radio tag 8 touch the robot 7. Then, in step S53, the wireless communication by RFID is performed again. Specifically, the wireless communication may be performed periodically for a predetermined period of time. As a result, when the authentication information V stored in the radio tag 8 is unable to be read, it is determined in step S56 that the authentication is unsuccessful; when the above-described information is able to be read, the process proceeds to step S54.

In step S54, based on the read authentication information V, it is determined whether or not the radio tag 8 of a transmission source of the authentication information V is registered in the authorized person registration information L of the sub-area where the detected person is currently present. The sub-area where the detected person is present may be determined based on the current position of the robot 7 and the map information M. As a result, in the case of the radio tag 8 having been registered, it is determined in step S55 that the authentication is successful and then the flow is ended. In contrast, in the case of the radio tag 8 being not registered, it is determined in step S56 that the authentication is unsuccessful and then the flow is ended.

The present invention is not limited to the embodiments described above, and also includes modification aspects of the above-described embodiments as well as appropriate combinations of these aspects.

Supplementary Notes (1) A detection device 1 according to at least one embodiment of the present invention is a detection device 1 configured to determine the presence or absence of the right of access to an interior of a target area of a human being present in the interior of the target area, the detection device 1 includes:

a detection unit 2 configured to detect the moving object 9, by using a ranging sensor 74 able to detect the presence of a moving object 9 movable in the target area;

a determination unit 3 configured to determine whether or not the detected moving object 9 is a human being by using a human detection sensor 75 able to detect a human being; and an authentication unit 4 configured to perform authentication of the detected moving object 9 in a case that the detected moving object 9 is determined to be a human being, the authentication unit includes, an authentication information request unit 41 configured to request the moving object 9 to transmit authentication information V by wireless communication, and an authentication determination unit 42 configured to determine whether or not the moving object 9 has the right of access based on a result of the wireless communication.

According to the configuration described in the above-described (1), after the detection of the moving object 9 such as a human being or an object moving in the target area in a plant or the like, or a movable temporary load by using, for example, a ranging sensor 74 being the LiDAR or the like, it is determined whether or not the detected moving object 9 is a human being by using, for example, the human detection sensor 75 such as an infrared sensor. Then, in the case where the moving object 9 is a human being, wireless communication is performed with, for example, a radio tag 8 for authentication assumed to be carried by the moving object 9, thereby performing the authentication. In other words, the ranging sensor 74 such as the LiDAR is able to find out a farther distanced object than in a case of using infrared rays, and first detects the moving object 9 and then determines whether or not it is a human being. This makes it possible to suitably detect the moving object 9 even when the moving object 9 is present at night or travels at high speed. Furthermore, by determining whether or not the detected moving object 9 is a human being, it is possible to prevent an erroneous detection from occurring in which the moving object 9 other than a human being, who should not have the radio tag 8, is taken as a suspicious person.

In the case where the moving object 9 is a human being, the above-described scheme may widely handle various situations including a case of the interior of a plant where a target area has the above-described conditions, for example, by performing authentication through wireless communication on the radio tag 8 or the like assumed to be carried by the moving object 9. That is, for example, in the plant, there are many areas including an area where it is compulsory to wear a protector for covering the face or the like and an area where large noise is output from devices, which makes it difficult to apply techniques therein such as face authentication by using a camera, voice authentication by using a microphone and the like. In the face authentication, image recognition may not be performed with sufficient accuracy depending on the darkness of the location and the movement velocity of the human being. However, according to the configuration described above, in the case where the moving object 9 is a human being, since the authentication can be performed through wireless communication with the radio tag 8 or the like without performing face authentication (image recognition) or voice authentication, it is possible to perform the authentication regardless of the wearing condition of the protector, the face orientation of the human being, and the magnitude of the noise, thereby making it possible to suitably detect a suspicious person.

(2) In some embodiments, in the configuration described in the above-described (1), the authentication information V is stored in the radio tag 8 owned by the moving object 9, and the authentication information request unit 41 is configured to request the radio tag 8 to transmit the authentication information V by performing the wireless communication utilizing the RFID with respect to the radio tag 8.

According to the configuration described in the above-described (2), a human being that is allowed to enter into the target area is expected to carry the radio tag 8, in which the authentication information V is stored. Then, the authentication information request unit 41 attempts to acquire the authentication information V from the radio tag 8 through wireless communication by RFID, when the detected moving object 9 is a human being. With this, the authentication can be simplified and secured.

(3) In some embodiments, in the configuration described in the above-described (1) and (2), the authentication determination unit 42 is configured to determine that the moving object 9 does not have the right of access when the authentication information V is not received in response to the transmission request.

According to the configuration described in the above-described (3), it is possible to suitably determine whether or not the detected moving object 9 (detected person) has the right of access.

(4) In some embodiments, in the configuration described in the above-described (1) to (3), further included is an alarm output unit 5 of an alarm W configured to output the alarm W in a case where the authentication unit 4 determines that the moving object 9 does not have the right of access.

According to the configuration described in the above-described (4), it is possible to output the alarm with respect to the moving object 9 not having the right of access, transmit to the administrator a notification A telling the intrusion of the moving object 9 not having the right of access.

(5) In some embodiments, in the configuration described in the above-described (1) to (4), further included is a notification unit 51 configured to transmit the notification A to the outside, and the notification unit 51 includes a distance acquisition unit 52 configured to acquire a distance to the detected moving object 9, and a transmission unit 53 configured to transmit the notification A based on the acquired distance.

According to the configuration described in the above-described (5), behavior of the moving object 9 as a detected human being (detected person) is monitored based on the distance between the detection device 1 and the moving object 9. This makes it possible to detect the behavior of the detected person that looks like running away and transmit the notification A to the administrator. Thus, a person taking such behavior may be detected as a suspicious person even before performing authentication.

(6) In some embodiments, in the configuration described in the above-described (1) to (5), the detection unit 2 is configured to detect the presence of the moving object 9 based on a comparison between a detection result of the ranging sensor 74 and map information M of the target area.

According to the configuration described in the above-described (6), an object that does not exist in the map information M is detected as the moving object 9 by using, for example, the map information M indicating a positional relationship of installed objects that are fixedly installed in the target area. This makes it possible to suitably detect the moving object 9.

(7) A robot 7 according to at least one embodiment of the present invention includes:

the detection device 1 described in any one of the above-described (1) to (6);

the main body portion 71, on which the detection device 1 is mounted;

the drive device 72 configured to move the main body portion 71; and the control unit 73 configured to control the drive device 72.

According to the configuration described in the above-described (7), the detection device 1 is configured to be movable by the drive device 72. This makes it possible to detect the intrusion of a suspicious person across a wide range by the movement of the robot 7 without disposing a plurality of detection devices 1 in the target area.

(8) In some embodiments, in the configuration described in the above-described (7), the target area includes a plurality of sub-areas; a selection unit 79 is further included being configured to select one of the movement patterns P from among a plurality of movement patterns P each defining the sequence of movements between at least some of the sub-areas among the plurality of sub-areas, and the control unit 73 is configured to control the drive device 72 in accordance with the selected one movement pattern P.

According to the configuration described in the above-described (8), the robot 7 moves in accordance with the movement pattern P selected from among the plurality of movement patterns P. This makes it difficult for a person not allowed to enter the target area or the sub-area to estimate a movement route R of the robot 7 and a passage time of the robot 7 at any position, thereby making it possible to enhance an effect of prevention of the intrusion.

(9) In some embodiments, in the configuration described in the above-described (7) and (8), the target area includes the plurality of sub-areas; the authentication unit 4 is configured to execute processing in accordance with each of a plurality of patrol modes including a simple patrol mode; and the authentication unit 4 is configured to finish the authentication in this sub-area, in a case that the authentication of the moving object 9 detected first is successful in the sub-area where the simple patrol mode is set.

In the configuration described in the above-described (9), the authentication unit 4 is configured to execute the processing in accordance with the set patrol mode, and when the authentication of the moving object 9 detected first is successful in the case of the simple patrol mode being set, the authentication in that sub-area is finished. For example, although many people, such as workers, may be present in some sub-areas, there is a case in which necessity for individually performing authentication on each person is low. In such case, by performing authentication on the first single person, the authentication in that sub-area is finished. This makes it possible to prevent a situation from occurring in which a considerably large amount of time is needed to detect a suspicious person in a certain sub-area and consequently a larger amount of time than expected is needed for the robot 7 to move across the whole target area, thereby making it possible to suitably detect suspicious persons in the whole target area.

(10) In some embodiments, in the configuration described in the above-described (8) and (9), further included is a check execution unit 7a configured to run a check on the interior of the target area by using a sensor including at least one of the ranging sensor 74 or the human detection sensor 75.

According to the configuration described in the above-described (10), the robot 7 is configured so as to be able to check the interior of the target area and detect a suspicious person at the same time. As described above, since the robot 7 has the check function and the patrol function, these functions can be provided by the single robot 7 without using a suspicious person detection (patrol) robot 7 and a check robot 7 separately.

(11) A detection method according to at least one embodiment of the present invention is a detection method for determining the presence or absence of the right of access to an interior of a target area of a human being present in the interior of the target area, the detection method includes:

a step of detecting a moving object 9, by using a ranging sensor 74 able to detect the presence of the moving object 9 movable in the target area;

a step of determining whether or not the detected moving object 9 is a human being by using a human detection sensor 75 able to detect a human being; and a step of performing authentication of the detected moving object 9 in a case that the detected moving object 9 is determined to be a human being, the step of performing the authentication includes, a step of requesting authentication information V with respect to the moving object 9 by wireless communication, and a step of determining the authentication of whether or not the moving object 9 has the right of access based on a result of the wireless communication.

According to the configuration described in the above-described (11), similar effects to those described in the above-described (1) may be exhibited.

(12) A detection program 10 according to at least one embodiment of the present invention is a detection program 10 configured to determine the presence or absence of the right of access to an interior of a target area of a human being present in the interior of the target area, the detection program 10 includes:

causing a computer to realize, a detection unit 2 configured to detect the moving object 9, by using a ranging sensor 74 able to detect the presence of a moving object 9 movable in the target area;

a determination unit 3 configured to determine whether or not the detected moving object 9 is a human being by using a human detection sensor 75 able to detect a human being; and an authentication unit 4 configured to perform authentication of the detected moving object 9 in a case that the detected moving object 9 is determined to be a human being, the authentication unit 4 includes an authentication information request unit 41 configured to request the authentication information V with respect to the moving object 9 by wireless communication, and an authentication determination unit 42 configured to determine whether or not the moving object 9 has the right of access based on a result of the wireless communication.

According to the configuration described in the above-described (12), effects similar to those described in the above-described (1) are exhibited.

While preferred embodiments of the invention have been described as above, it is to be understood that variations and modifications will be apparent to those skilled in the art without departing from the scope and spirit of the invention.

The scope of the invention, therefore, is to be determined solely by the following claims.

The invention claimed is:

1. A suspicious person detection device configured to detect a suspicious person in a target area, the suspicious person detection device comprising:
    a selection unit configured to select different movement patterns among a plurality of movement patterns for the suspicious person detection device to move within the target area;
    a detection unit configured to detect a moving object within the target area, by using a ranging sensor able to detect presence of the moving object movable in the target area;
    a determination unit configured to determine whether the detected moving object is a human being by using a human detection sensor able to detect a human being; and
    an authentication unit configured to perform authentication of the detected moving object in a case that the detected moving object is determined to be a human being and including,
    an authentication information request unit configured to request the moving object to transmit authentication information by wireless communication, and
    an authentication determination unit configured to determine whether the moving object has the right of access to the interior of the target area based on a result of the wireless communication,
    wherein the target area includes a plurality of sub-areas set within the target area, each sub-area having a corresponding security level,
    the selection unit selects the different movement patterns of the suspicious person detection device based on the corresponding security levels of the sub-areas,
    the authentication unit is configured to execute processing in accordance with each of a plurality of patrol modes including a simple patrol mode, and
    the authentication unit is configured to finish authentication in a sub-area, in a case that the authentication of the moving object detected first is successful in the sub-area where the simple patrol mode is set.

2. The suspicious person detection device according to claim 1,
    wherein the authentication information is stored in a radio tag owned by the moving object, and
    the authentication information request unit is configured to request the radio tag to transmit the authentication information by performing the wireless communication utilizing RFID with respect to the radio tag.

3. The suspicious person detection device according to claim 1,
    wherein the authentication determination unit is configured to determine that the moving object is the suspicious person in a case that the authentication information is not received in response to the transmission request.

4. The suspicious person detection device according to claim 1, further comprising:
    an alarm output unit configured to output an alarm in a case that the authentication unit determines that the moving object is the suspicious person.

5. The suspicious person detection device according to claim 1, further comprising:
    a notification unit configured to perform notification to an outside,
    wherein the notification unit includes a distance acquisition unit configured to acquire a distance to the detected moving object, and a transmission unit configured to transmit the notification based on the acquired distance.

6. The suspicious person detection device according to claim 1,
    wherein the detection unit is configured to detect the presence of the moving object based on a comparison between a detection result of the ranging sensor and map information of the target area.

7. A robot comprising:
    the suspicious person detection device according to claim 1;
    a main body portion on which the suspicious person detection device is mounted;
    a drive device configured to move the main body portion; and
    a control unit configured to control the drive device.

8. The robot according to claim 7,
    wherein the robot includes a selection unit and is configured to select one of movement patterns, from among the plurality of the movement patterns each defining a sequence of movements between at least some sub-areas among the plurality of sub-areas, and
    the control unit is configured to control the drive device in accordance with the selected one movement pattern.

9. The robot according to claim 8, further comprising:
    a check execution unit configured to run a check on an interior of the target area by using a sensor including at least one of the ranging sensor or the human detection sensor.

10. A suspicious person detection method for detecting a suspicious person in a target area, the method comprising:
    selecting different movement patterns among a plurality of movement patterns for the suspicious person detection device to move within the target area;
    detecting a moving object in the target area, by using a ranging sensor able to detect presence of the moving object movable in the target area;
    determining whether the detected moving object is a human being by using a human detection sensor able to detect a human being; and
    performing authentication of the detected moving object in a case that the detected moving object is determined to be a human being, the performing the authentication including, requesting the moving object to transmit authentication information by wireless communication, and
    determining whether the moving object has the right of access to the interior of the target area based on a result of the wireless communication,
    wherein the target area includes a plurality of sub-areas set within the target area, each sub-area having a corresponding security level,
    the different movement patterns of the suspicious person detection device are selected based on the corresponding security levels of the sub-areas,
    the performing of authentication includes executing processing in accordance with each of a plurality of patrol modes including a simple patrol mode, and
    the performing of authentication includes finishing authentication in a sub-area, in a case that the authentication of the moving object detected first is successful in the sub-area where the simple patrol mode is set.

11. A non-transitory computer readable medium storing a program configured to detect a suspicious person in a target area, the program comprising:

causing a computer to realize,
- a selection unit configured to select different movement patterns of the suspicious person detection device within the target area;
- a detection unit configured to detect a moving object, by using a ranging sensor able to detect presence of the moving object movable in the target area;
- a determination unit configured to determine whether the detected moving object is a human being by using a human detection sensor able to detect a human being; and
- an authentication unit configured to perform authentication of the detected moving object in a case that the detected moving object is determined to be a human being, and including,
- an authentication information request unit configured to request the moving object to transmit authentication information by wireless communication, and
- an authentication determination unit configured to determine whether the moving object has the right of access to the interior of the target area based on a result of the wireless communication,
- wherein the target area includes a plurality of sub-areas set within the target area, each sub-area having a corresponding security level,
- the selection unit selects the different movement patterns of the suspicious person detection device based on the corresponding security levels of the sub-areas,
- the authentication unit is configured to execute processing in accordance with each of a plurality of patrol modes including a simple patrol mode, and
- the authentication unit is configured to finish authentication in a sub-area, in a case that the authentication of the moving object detected first is successful in the sub-area where the simple patrol mode is set.

12. The suspicious person detection device according to claim 1, wherein each movement pattern is selected in a predetermined sequence.

13. The suspicious person detection device according to claim 1, wherein the determination unit further includes a learning model that outputs a determination result of whether the moving object is a human being based on at least one of a shape of temperature distribution in a thermal image of the object or a shape of the object contained in point group data received from the human detection sensor.

14. The suspicious person detection device according to claim 1, wherein the speed of the of the suspicious person detection device selected by the selection unit for one sub-area is different from the speed of the suspicious person detection device selected for another sub-area.

* * * * *